United States Patent [19]

Chassaigne et al.

[11] Patent Number: 4,891,010

[45] Date of Patent: Jan. 2, 1990

[54] SIMULATOR FOR AN INSTALLATION FOR LOCATING AND GUIDING AN AERIAL BODY IN MOTION AND INSTALLATION OF THIS TYPE PROVIDED WITH SUCH A SIMULATOR

[75] Inventors: Georges Chassaigne, Begles; Jean R. Saffores, Martignas, both of France

[73] Assignee: Societe Nationale Industrielle Aerospatiale, Paris, France

[21] Appl. No.: 122,511

[22] Filed: Nov. 18, 1987

Related U.S. Application Data

[63] Continuation of Ser. No. 826,563, Feb. 6, 1986, abandoned.

[30] Foreign Application Priority Data

Feb. 8, 1985 [FR] France ................. 85 01843

[51] Int. Cl.⁴ .............................................. G09B 4/08
[52] U.S. Cl. .................................................... 434/2
[58] Field of Search .......................................... 434/2

[56] References Cited

U.S. PATENT DOCUMENTS 4,424,038  1/1984  Tingleff et al. ..................... 434/2
4,702,698 10/1987  Beckwith et al. .................... 434/2

Primary Examiner—Thomas H. Tarcza
Assistant Examiner—Mark Hellner
Attorney, Agent, or Firm—Marshall, O'Toole, Gerstein, Murray & Bicknell

[57] ABSTRACT

This invention relates to a simulator for an installation for locating and guiding a self-propelled, remote-controlled aerial body in motion, wherein said simulator comprises means for simulating the radar, the aerial body in motion and the remote-control emitter, and it may be connected, in place of said radar and said remote-control emitter respectively, at the input of the radar control panel and at the output of the remote-control panel, by means of a switching system.

5 Claims, 3 Drawing Sheets

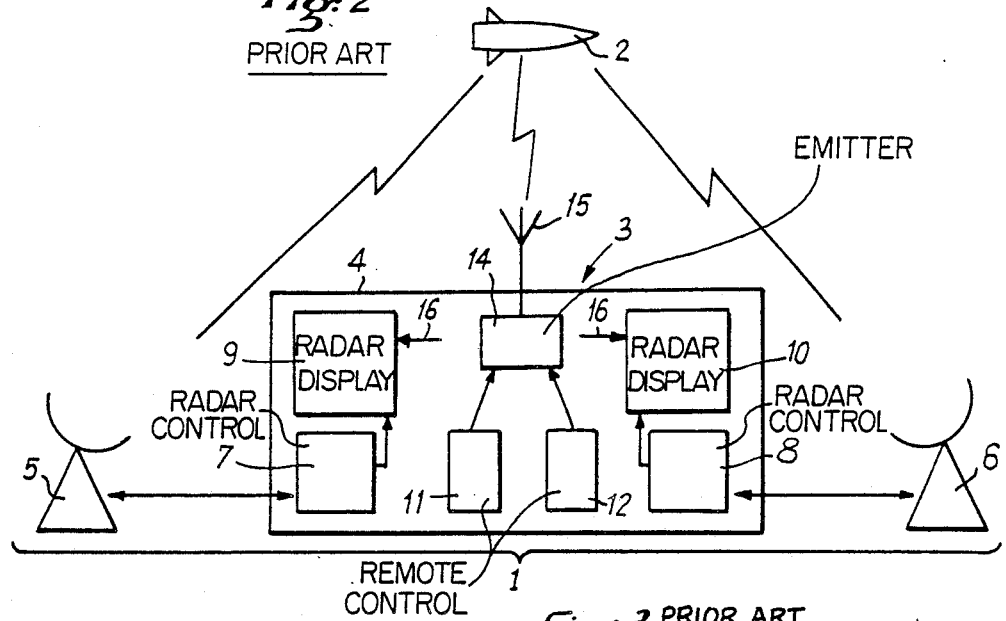

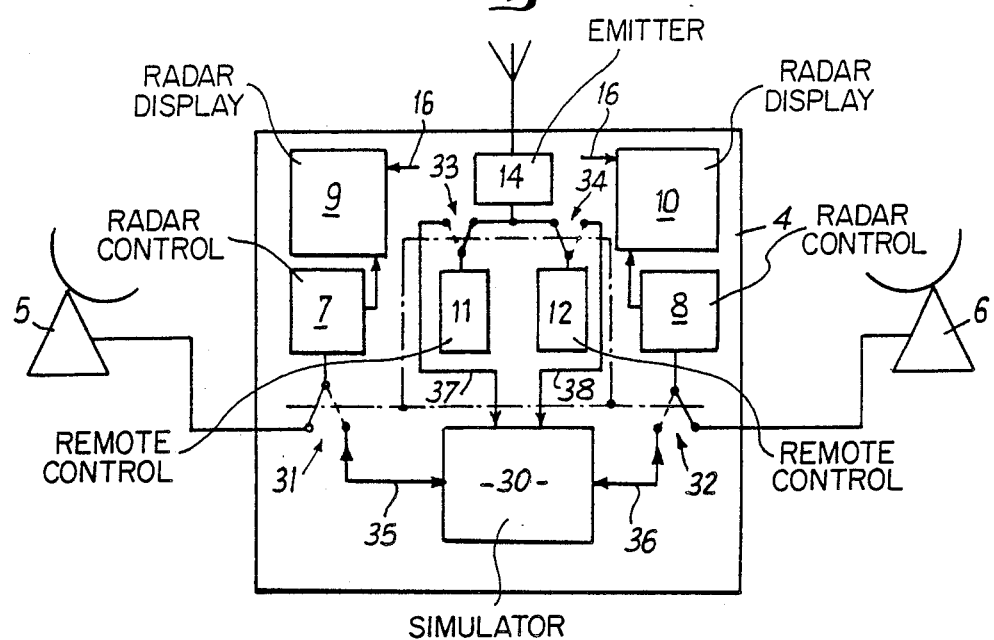
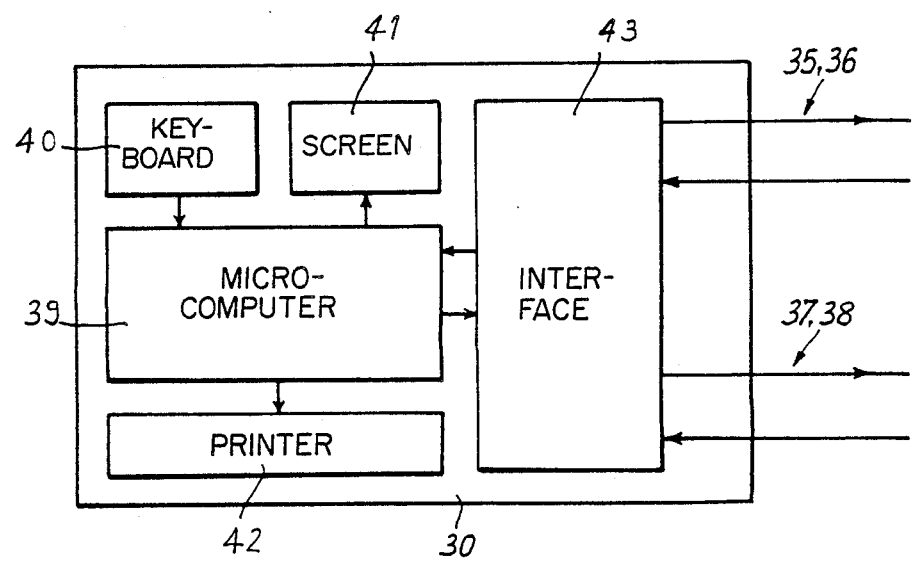

SIMULATOR FOR AN INSTALLATION FOR LOCATING AND GUIDING AN AERIAL BODY IN MOTION AND INSTALLATION OF THIS TYPE PROVIDED WITH SUCH A SIMULATOR

This application is a continuation of application Ser. No. 826,563, filed Feb. 6, 1986, now abandoned.

The present invention relates to a simulator for an installation for locating and guiding a selfpropelled and remote-controlled aerial body in motion, as well as to such an installation provided with this simulator.

An installation of this type is already known, which comprises:
  electronic calculating means,
  means for continuously locating said body in motion during its flight, comprising at least one radar and one radar control panel, adapted for the control and exploitation of the information from said radar;
  means for displaying the map of a geographical region having to be flown over by said body in motion;
  means for displaying a theoretical predetermined path that said body in motion must follow during its flight, said theoretical predetermined path being superposed on said map;
  means for progressively plotting the real path followed by said body in motion as its flight progresses, said real path being superposed on said map; and
  remote-control means for acting on the position of said body in motion during flight, so that said real path is as close as possible to said theoretical predetermined path, said remote-control means comprising an emitter and at least one remote-control panel of said emitter.

Such an installation is for example intended for constantly supervising the programmed flight of a missile so that the latter does not go astray and does not risk causing accidents by continuing its flight after having deviated from its programmed flight and escaped the control of an operator remotely controlling it.

In order to be efficient, the operators using such an installation must, of course, be trained. Now, training with he installation operating normally raises difficulties. It firstly necessitates firing a missile, which is always expensive and requires constraining precautionary measures and permission from the authorities which is sometimes difficult to obtain, due to the disturbances that such a missile may cause, for example in air traffic. As a result, the missile is very often replaced by an aircraft, for example a helicopter. However, in that case, training of the operators is not optimum, since the flight conditions of a helicopter are very different from those of a missile. This is therefore only makeshift and, in any case, does not solve all the problems. In fact, it is still necessaary to take precautions and to obtain permission from the authorities for the flight of the target helicopter not to risk being a hindrance to normal air traffic and for the electro-magnetic links between the installation and the helicopter not to disturb the radio transmissions transiting through the zone in which said operators are being trained.

It is an object of the present invention to overcome these drawbacks.

To this end, according to the invention, the simulator for the installation of the type mentioned hereinabove is noteworthy in that it comprises means for simulating said radar, said aerial body in motion and said remote-control emitter, and in that it may be connected, in place of said radar and said remote-control emitter respectively, at the input of said radar control panel and at the output of said remote-control panel, by means of a switching system.

Operators of the installation may thus, according to the invention, be trained by means of said installation, with the result that said operators can familiarize themselves with its various elements, without the operation of the installation during training necessitating the actual flight of an aerial body in motion and electro-magnetic links between the installation and such a body in motion. During training, the installation therefore operates in isolation, looped on itself. The simulator according to the invention therefore enables the operators to be trained under conditions similar to those of normal use of the installation.

The simulator according to the invention preferably comprises means for producing, step by step, a simulated path appearing in place of said real path in superposition on said map and means for introducing unexpected changes in said simulated path.

In this way, an instructor may introduce changes in said simulated path as it progresses, in order to test the reactions of the or each operator.

In order that the instructor can occupy a separate work station at some distance from the work stations occupied by the operators being trained, said simulator advantageously comprises auxiliary display means on which said map, said predetermined theoretical path and the simulated path, which may be changed by the means for introducing modifications, also appear.

Said means for producing the simulated path preferably comprise a micro-computer, in which case they comprise an interface device linked on the one hand with said micro-computer and on the other hand with said radar control panel and said remote-control panel.

The present invention also relates to an installation provided with a simulator of the type described hereinabove.

The installation according to the invention, adapted for locating and guiding a self-propelled, remote-controlled aerial body in motion and comprising:
  electronic calculating means,
  means for continuously locating said body in motion during its flight, comprising at least one radar and one radar control panel, adapted for the control and exploitation of the information from said radar;
  means for displaying the map of a geographical region having to be flown over by said body in motion;
  means for displaying a theoretical predetermined path that said body in motion must follow during its flight, said theoretical predetermined path being superposed on said map;
  means for progressively plotting the real path followed by said body in motion as its flight progresses, said real path being superposed on said map; and
  remote-control means for acting on the position of said body in motion during flight, so that said real path is as close as possible to said theoretical predetermined path, said remote-control means comprising an emitter and at least one remotecontrol panel of said emitter, is noteworthy in that it comprises a simulator capable of simulating said radar, said aerial body in motion and said remotecontrol emitter as well as a switching system capable of connecting said simulator to the input of said radar control panel and to the output of said remotecontrol panel, respectively in place of said radar and said remote-control emitter.

The invention will be more readily understood on reading the following description with reference to the accompanying drawings, in which:

FIG. 2 is the electronic block diagram of the embodiment of installation of FIG. 1, in which, for simplification, the links of the different elements with the computer of said installation have not been shown.

Figure 1:
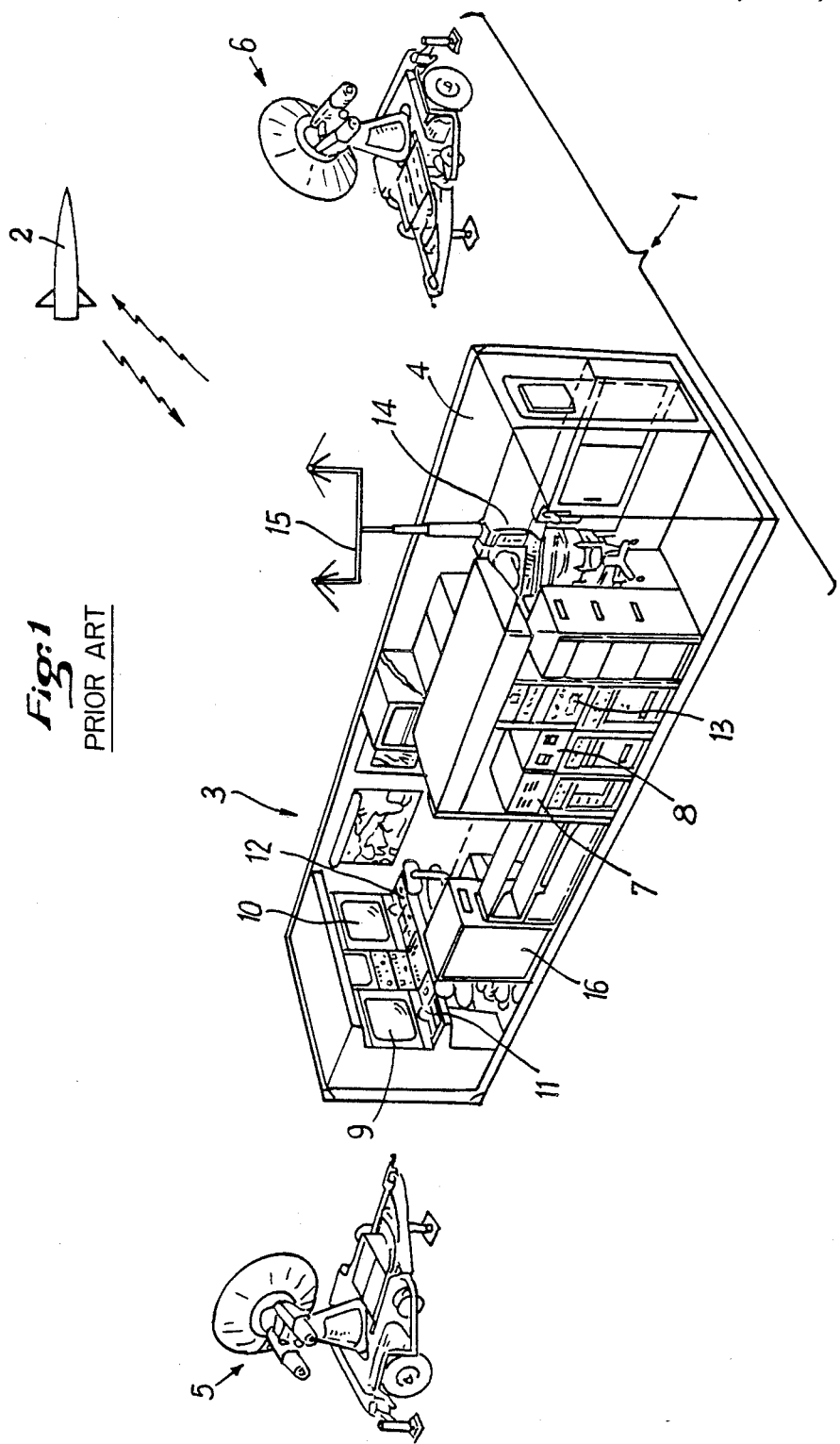
FIG. 1 is a view in perspective of an embodiment of installation to which the present invention is applied.

FIG. 3 gives an example of image displayed by the graphic display means of said installation.

FIG. 4 gives the block diagram, comparable with that of FIG. 2, of the embodiment of the latter Figure, amended to incorporate the simulator according to the present invention.

FIG. 5 gives the block diagram of an embodiment of the simulator according to the invention.

Referring now to the drawings, the installation shown in FIG. 1 is intended for locating and guiding an aerial body 2 in motion. This aerial body 2 in motion is for example a military reconnaissance missile which is provided with independent propelling means and which, after having taken off from a "friendly" territory, must fly over an "enemy" territory, following a predetermined path, and return into "friendly" territory, where it lands and delivers the information that it has been able to gather during its flight. Such an installation is mainly used in peace time, for training the personnel in charge of exploiting said information in order to enable said missile 2 to be recovered each time; to this end, it is a principal object of the installation 1 to oblige the missile 2 to follow this predetermined path as closely as possible and to prevent it from deviating too much therefrom and getting lost, particularly due to the aerological conditions of the flight. In fact, in time of war, the electro-magnetic waves produced and received by the installation 1 would risk allowing the enemy to detect the installation 1 and the missile 2 and therefore facilitating destruction thereof. Consequently, in time of war, the missile 2 is fired, after which it must follow its predetermined path alone, without being guided. The risk that, if the aerological flight conditions result in the missile 2 considerably deviating from its predetermined path, said missile 2 will not return to friendly territory and be lost, is voluntarily taken.

Of course, installation 1 knows the predetermined path that missile 2 must follow and it furnishes an operator with the necessary indications for him to be able, by remote-control, possibly to correct the actual flight of the missile so that the actual path thereof is as close as possible to the predetermined path.

The embodiment of installation 1 shown in FIGS. 1 and 2 comprises an electronic unit 3 assembled in a housing 4, for example mounted on a vehicle, and two radars 5 and 6. The electronic unit 3 comprises two radar panels 7 and 8, respectively associated with radar 5 and with radar 6 and with respective graphic display devices 9 or 10. This electronic unit 3 further comprises two remote-control panels 11 and 12, associated with a remote-control rack 13 and actuating a remote-control emitter 14, which is capable of acting on the flight of missile 2, via an antenna system 15. A computer 16 controls the whole of the installation and stores in memory information concerning geographical regions likely to be flown over by missile 2 and the theoretical paths thereof in said regions.

It will be noted that, in the embodiment shown, two radar and display chains (5, 7, 9 and 6, 8, 9) are provided, as well as two remote-control chains 11, 14, 15 and 12, 14, 15. Such duplication is intended to allow redundancy of the functions of locating, tracking and remote-control, in order to ensure in complete safety the monitoring of the flight volume of the missile 2 and to avoid any failure of one of these functions during flight compromising such monitoring. Of course, such a redundancy is not essential for the simulator according to the invention, which may be used for an installation comprising only one radar and display chain and only one remote-control chain.

Radars 5 and 6 are of the tracker radar type and their function is to pick up the position of missile 2 in flight; they furnish their information to the corresponding radar control panels 7 and 8 and this information is for example constituted by the elevation angle, the relative bearing and the distance of said missile 2.

This information is processed by the control panels and displayed in display windows in devices 9 and 10. The radars 5 and 6 further comprise, in known manner, clock synchronization and video signal processing circuits, which transmit their information to radar control panels 7 and 8.

The radar control panels 7 and 8 are work stations, allowing display of the missile in flight. They comprise a plurality of controls and displays making it possible:

to position the radar antenna system 5 and 6 in elevation;

to position the radar antenna system 5 and 6 in bearing;

to display the echo, elevation angle, relative bearing and distance of missile 2;

to control a telemetry chain;

to identify breakdowns;

to ensure tracking of missile 2 in flight.

When missile 2 is fired, radars 5 and 6 operate in manual target-seeking mode, i.e. for pick-up of missile 2. As soon as the latter is picked up by radars 5 and 6, the latter (as well as the telemetry) then function in automatic tracking mode. They automatically follow missile 2 in flight. For example, they analyze every millisecond the differences between the former position and the new position of missile 2, so as to control themselves.

From the elevation and bearing information that they receive from radars 5 and 6, the radar control panels 7 and 8 calculate the cartesian coordinates of missile 2, which they address to the graphic display devices 9 and 10.

Graphic display devices 9 and 10 are also work stations. They are each provided with a screen on which they display (cf. FIG. 3):

a geographical map background 17 corresponding to the region over which missile 2 flies and stored in computer 16; the flight envelope is limited by a boundary 18 and the map 17 comprises reference zones 19;

a path 20, predetermined and stored in computer 16; the missile must theoretically follow this path 20 in the course of its mission, between the take-off point 21a and its point of landing 21b;

the real path 22 followed by missile 2 during its flight, and plotted as it progresses. This real path 22 is capable of deviating from the theoretical predetermined path 20 and the operator or operators of installation 1 may act in real time on missile 2, via chains 11, 14, 15 and 12, 14, 15 to cause said real path 22 to be as close as possible to the theoretical predetermined path 20.

In addition, the following appear on the screen of the display devices 9 and 10:

a distance gauge window 23, enabling the operators to know at any instant of flight of missile 2, the real position of said missile with respect to its predetermined position, as well as its tendency to move away from or approach its theoretical predetermined path. To this end, in the distance gauge window, the instantaneous real position of missile 2 is shown by a cross 24 with which are associated two orthogonal arrows 25 and 26, whose length is representative of the speed with which said missile moves away from or approaches the center 27 of the window 23, said center 27 representing the instantaneous theoretical position of said missile 2;

an alphanumeric window 28 in which are displayed the date and time of the flight, as well as the instantaneous altitude, speed, difference in altitude with respect to the reference altitude, the duration of flight, etc...

In this way, for the whole duration of flight of missile 2, it is possible to know all the decisive parameters likely to assist in making a decision of action on the remote-control chains 11, 14, 15 and/or 12, 14, 15, if missile 2 moves away from its theoretical predetermined path 20.

The remote-control chains 11, 14, 15 and 12, 14, 15 may make it possible to act on the direction of missile 2 in order to correct its path or to cause it to land. The possible orders are, for example: turn to the right, turn to the left and land. In this latter case, for example, the altitude is not taken into account and missile 2 must comprise automatic means for respecting an instantaneous reference altitude.

It is an object of the present invention to provide a simulator which enables the installation of FIGS. 1 and 2 to operate without necessitating firing of a missile 2.

The simulator according to the invention is integrated in installation 1 and it performs the functions normally fulfilled by missile 2, radars 5 and 6 and remote-control emitter 14.

FIG. 4 illustrates, in a schematic view comparable to that of FIG. 2, the incorporation of the simulator, designated by reference 30, in said installation. It has been assumed that simulator 30 was disposed inside housing 4.

FIG. 4 schematically illustrates four twoposition switches 31, 32, 33 and 34.

Switch 31 (or 32), disposed at the input of radar control panel 7 (or 8), makes it possible, for one of its positions shown in solid lines, to connect said radar control panel to corresponding radar 5 (or 6) and, for its other position shown in broken lines, to connect said radar control panel to simulator 30 via a link 35 (or 36).

Furthermore, switch 33 (or 34), disposed at the output of remote-control panel 11 (or 12) makes it possible, for one of its positions shown in solid lines, to connect said remote-control panel to the remote-control emitter 14 and, for its other position shown in broken lines, to connect said remote-control panel to simulator 30 via a link 37 (or 38).

As illustrated by the chain-dotted lines, the four switches 31 to 34 are coupled in order to trip simultaneously. In this way they simultaneously occupy either their positions connecting the radar control panels 7 and 8 to radars 5 and 6 and the remote-control panels 11 and 12 to the remote-control emitter 14, or their positions connecting the radar control panels 7 and 8 and the remote-control panels 11 and 12 to simulator 30.

FIG. 4 shows switches 31 to 34 in the form of mechanical rocker switches, but it goes without saying that this is only a schematic representation and that said switches may have any other appropriate structure.

Simulator 30 performs different tasks. It:

produces a programmed, simulated path corresponding to the real path 22 produced by the installation when operating normally, this simulated path being progressively displayed, as the simulated flight progresses, on the screens of the graphic display devices 9 and 10, in superposition on map 17 and on the predetermined path 20, so that, for the operator looking at one of said screens, everything occurs as if operation of the installation were real;

allows operation of the radar control panels 7 and 8 in all the configurations of search and tracking, similar to the real configurations;

takes into account the remote-control orders emitted by control panels 11 and/or 12, consequently modifying the simulated path;

in addition, performs functions of instructions such as:

modification of the simulated path by introduction of simulated aerological conditions;

modification of the simulated path by action on the remote-control panels 11 and 12;

creation of simulated breakdowns relating to radars 5 and 6;

creation of simulated breakdowns relative to the aerial body 2 in motion;

monitoring the operators' reactions.

All the controls made by an operator on a radar control desk 7 or 8 are taken into account and processed by simulator 30. The latter exploits them in order to modify the data retransmitted to radar control desks 7 and 8.

Similarly, the information emitted by the remote-control panels 11 and 12, actuated by one or more operators, is taken into account by simulator 30, which corrects the simulated path so as to carry out the remote-control orders emitted. This therefore brings about a change in the coordinates of the radars, displayed on the display devices 9 and 10.

In the embodiment schematically shown in FIG. 5, simulator 30 comprises:

a micro-computer 39, in relation with peripheral apparatus, such as a keyboard 40, a screen 41 and a printer 42; and an interface device 43.

The interface device 43 is linked, on the one hand, with the micro-computer 39 and, on the other hand, with the radar control panels 7, 8 and the remote-control panels 11, 12, via links 35, 36 and 37, 38 respectively.

The micro-computer 39 creates, by programmation, simulated flight conditions, and in particular a simulated path for missile 2 on which an instructor can intervene in real time thanks to keyboard 40, in order to modify the parameters of the simulated flight. In simulation mode, the map 17 and the theoretical path 20 may continue to be produced by computer 16 of installation 1. Micro-computer 39 elaborates the information on elevation, bearing, distance, functions of time and possible breakdowns, cyclically. The information is transmitted to the interface device 43 which stores it in its memories, processes it and sends it to the radar control panels 7, 8.

The interface device 43 receives the orders elaborated by the radar control panels 7, 8 under the action of the operator or operators. It processes them and consequently amends its output information.

The interface device 43 also receives the orders coming from the remote-control panels 11 and 12 and addresses them to micro-computer 39 in order to display them and modify the course of the simulated path, acting as real path 22.

The interface device 43 may present a structure of independent functions such as bearing function, elevation function, distance function, telemetry function, remote-control function, etc...

The keyboard 40, screen 41 and possible printer 42 constitute a work station for an instructor. The map 17, the theoretical path 20 and the simulated path in the course of elaboration appear on screen 41. The instructor may, at any time, with the aid of keyboard 40, introduce modifications in the course of the simulated path. Such modifications which also appear on the display devices 9 and 10 must cause the operator or operators to react and make corrections. Such corrections appear on the display devices 9 and 10 (used by the operators) and on the screen 41, with the result that the instructor can check the quality of the operator's work.

In simulated operation mode, the distance gauge window 23 and the alphanumeric window 28 appearing on display devices 9 and 10 naturally give the information concerning the simulated flight, programmed in the micro-computer 39. Arrows 25 and 26 are in that case reference elements of considerable importance, since, on the one hand, they enable the operator to assess the importance and direction of the corrections to be made and, on the other hand, enable the instructor to check the operator's reactions.

What is claimed is:

1. A simulator for an installation (1) for locating and guiding a self-propelled, remote-controlled aerial body (2) in motion, said installation comprising:
   electronic calculating means (16);
   means for continuously locating said body in motion during its flight, comprising at least one radar (5,6) and one radar control panel (7,8), adapted for the control and exploitation of the information from said radar;
   means for displaying the map (17) of a geographical region to be flown over by said body in motion;
   means for displaying a theoretical predetermined path (20) that said body in motion must follow during its flight, said theoretical predetermined path being superposed on said map;
   means for progressively plotting the real path (22) followed by said body in motion as its flight progresses, said real path being superposed on said map;
   and remote-control means for acting on the position of said body in motion during flight, so that said real path is as close as possible to said theoretical predetermined path, said remote-control means comprising an emitter (14) and at least one remote-control panel (11,12) of said emitter,
   said simulator comprising means (39) providing signals simulating said radar (5,6), said aerial body (2) in motion and said remote-control emitter (14) adapted to be connected, in place of said radar and said remote-control emitter respectively, at the input of said radar control panel (7,8) and at the output of said remote-control panel (11,12), by means of a switching system (31,32,33,34),
   wherein said signal providing means (39) produces step by step, a simulated path appearing in place of said real path (22) in superposition on said map (17) and said simulator further comprises means (40) for introducing unexpected changes in said simulated path.

2. The simulator of claim 1, further comprising auxiliary display means (4) on which said map, said predetermined theoretical path and the simulated path, which may be changed by means (40) introducing modifications, also appear.

3. The simulator of claim 1, wherein said means (39) for producing the simulated path comprise a micro-computer.

4. The simulator of claim 3, comprising an interface device (43) linked on the one hand with said micro-computer and on the other hand with said radar control panel and said remotecontrol panel.

5. An installation (1) for locating and guiding a self-propelled, remote-controlled aerial body (2) in motion, and comprising:
   electronic calculating means (16),
   means for continuously locating said body in motion during its flight, comprising at least one radar (5,6) and one radar control panel (7,8), adapted for the control and exploitation of the information from said radar;
   means for displaying the map (17) of a geographical region to be flown over by said body in motion;
   means for displaying a theoretical predetermined path (20) that said body in motion must follow during its flight, said theoretical predetermined path being superposed on said map;
   means for progressively plotting the real path (27) followed by said body in motion as its flight progresses, said real path being superposed on said map; and
   remote-control means for acting on the position of said body in motion during flight, so that said real path is as close as possible to said theoretical predetermined path, said remote-control means comprising an emitter (14) and at least one remote-control panel (11,12) of said emitter,
   said installation further including a simulator comprising means (39) providing signals simulating said radar (5,6), said aerial body (2) in motion and said remotecontrol emitter (14) adapted to be connected, in place of said radar and said remote-control emitter respectively, at the input of said radar control panel (7,8) and at the output of said remote-control panel (11,12), by means of a switching system (31,32,33,34),
   wherein said signal providing means (39) produces, step by step, a simulated path appearing in place of said real path (22) in superposition on said map (17) and said simulator further comprises means (40) for introducing unexpected changes in said simulated path.

* * * * *